(12) United States Patent
Wall et al.

(10) Patent No.: US 6,480,104 B1
(45) Date of Patent: Nov. 12, 2002

(54) TRAILER ALIGNMENT METHOD AND APPARATUS

(76) Inventors: Darby S. Wall, 7548 W. Limelight Ct., Boise, ID (US) 83703; Clint R. Wall, 25118 E. Grapewood, Meridian, ID (US) 83642

(*) Notice: Subject to any disclaimer, the term of this patent is extended or adjusted under 35 U.S.C. 154(b) by 0 days.

(21) Appl. No.: 09/841,329

(22) Filed: Apr. 23, 2001

(51) Int. Cl.$^7$ .............................................. G08B 21/00
(52) U.S. Cl. ........................ 340/431; 340/435; 340/531; 33/286; 280/477; 280/511
(58) Field of Search ................................ 340/431, 435, 340/436, 531, 825.36, 825.59, 825.69, 958; 33/263, 264, 286; 280/427, 477, 478.1, 504, 511

(56) References Cited

U.S. PATENT DOCUMENTS

| | | | |
|---|---|---|---|
| 4,187,494 A | 2/1980 | Jessee ....................... 340/52 R |
| 5,191,328 A | 3/1993 | Nelson ................... 340/870.06 |
| 5,455,557 A | 10/1995 | Noll et al. ................... 340/431 |
| 5,544,225 A | 8/1996 | Kennedy, III et al. ........ 379/59 |
| 5,650,764 A | 7/1997 | McCullough ................ 340/431 |
| 5,729,194 A | * 3/1998 | Spears et al. ............... 340/431 |
| 5,831,519 A | 11/1998 | Pedersen et al. .......... 340/425.5 |
| 5,905,433 A | 5/1999 | Wortham ..................... 340/431 |
| 5,999,091 A | 12/1999 | Wortham ..................... 340/431 |
| 6,064,299 A | 5/2000 | Lesesky et al. ............. 340/431 |
| 6,081,187 A | 6/2000 | Akutsu ........................ 340/436 |
| 6,100,795 A | 8/2000 | Otterbacher et al. ........ 340/431 |
| 6,120,052 A | 9/2000 | Capik et al. ................. 280/477 |
| 6,176,505 B1 | 1/2001 | Capik et al. ................. 280/477 |
| 6,178,650 B1 | 1/2001 | Thibodeaux ................. 33/286 |
| 6,259,357 B1 | * 7/2001 | Heider ........................ 340/431 |

* cited by examiner

*Primary Examiner*—Daniel J. Wu
*Assistant Examiner*—Davetta W. Goins
(74) *Attorney, Agent, or Firm*—Stephen M. Nipper; Frank J. Dykas; Robert L. Shaver (57) ABSTRACT

A trailer alignment device for simplifying the backing of a tow-vehicle to a trailer. The device utilizes a number of ultrasonic transducers to gauge the location of the tow-vehicle to the trailer. This information is transmitted to a control unit that analyzes such data and creates a visual display for the operator to use in backing the tow-vehicle to the trailer.

12 Claims, 12 Drawing Sheets

TRAILER ALIGNMENT METHOD AND APPARATUS

BACKGROUND OF THE INVENTION

1. Field of the Invention

The present invention generally relates to tow-vehicles and drawn-vehicles, and more particularly relates to devices and methods used to assist an operator in aligning an automobile's hitch component with a corresponding trailer's hitch component.

2. Background Information

There are many known methods and apparatuses known for the purpose of helping a vehicle operator back up a vehicle into hitching alignment with a trailer or other towable object. For instance, the patents to Nelson (U.S. Pat. No. 5,191,328), Noll, e t al. (U.S. Pat. No. 5,455,557), McCullough (U.S. Pat. No. 5,650,764), Otterbacher, et al. (U.S. Pat. No. 6,100,795), Capik et al. (U.S. Pat. No. 6,120,052), Capik et al. (U.S. Pat. No. 6,176,505), and Thibodeaux (U.S. Pat. No. 6,178,650) all show such methods/apparatuses.

Problems with the prior art methods and apparatuses include the inability to compensate for angle of attack and pitch in the backing process, and the inability to compensate for environmental conditions. In addition to the previous problems, all prior art methods and apparatuses require pre-measured parameters (distances) in the system before operations could occur properly. Embodiments of the present invention addresses these needs.

SUMMARY OF THE INVENTION

The present invention is a method and apparatus that makes the task of backing a vehicle up into hitching alignment with a trailer both easier and less stressful. The preferred embodiment of the present invention utilizes a hand-held electronic device (the "control unit") that can be plugged into the cigarette lighter of any automobile, semi-truck tractor, motor home vehicle, or other towing vehicle. The control unit aids the driver during the trailer alignment process by showing the relative positions of the tow-vehicle and the trailer with respect to each other. The control unit, either directly or through use of intermediary transceivers, connects with a number of sensors placed on the rear portion of the tow vehicle and a number of sensors placed on the front portion of the trailer. In the preferred embodiment, these sensors are connected to transmitters which transmit sensor data to the control unit, however other methods of transferring sensor data to the control unit are also envisioned, including, but not limited to direct wire connections.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary the invention is to cover all modifications, alternative constructions, and equivalents falling within the spirit and scope of the invention as defined in the claims.

While the primary use of the present invention is in aligning a tow vehicle (such as a pickup truck) with a towed or drawn vehicle (such as a trailer), other applications are also envisioned, including but not limited to aligning semi-truck tractors and trailers. Also, because many of the components of the present invention could be located on either the tow vehicle or the trailer, it is assumed that in this disclosure that specifically referring to one component being located on a particular vehicle (tow or trailer) is not intended as a limitation. Generally, this disclosure will discuss the present invention in view of a tow vehicle ("vehicle") and a drawn vehicle ("trailer"). The invented system will also work with multiple trailers and one tow-vehicle. For example, in a semi-truck with a tractor-trailer-trailer combination, the hook-up of the trailer to the trailer by the invented system will work with the one hand-held control unit in the tractor vehicle. The system would be realized by attaching a transceiver on both the front and back of each trailer.

Figure 1:
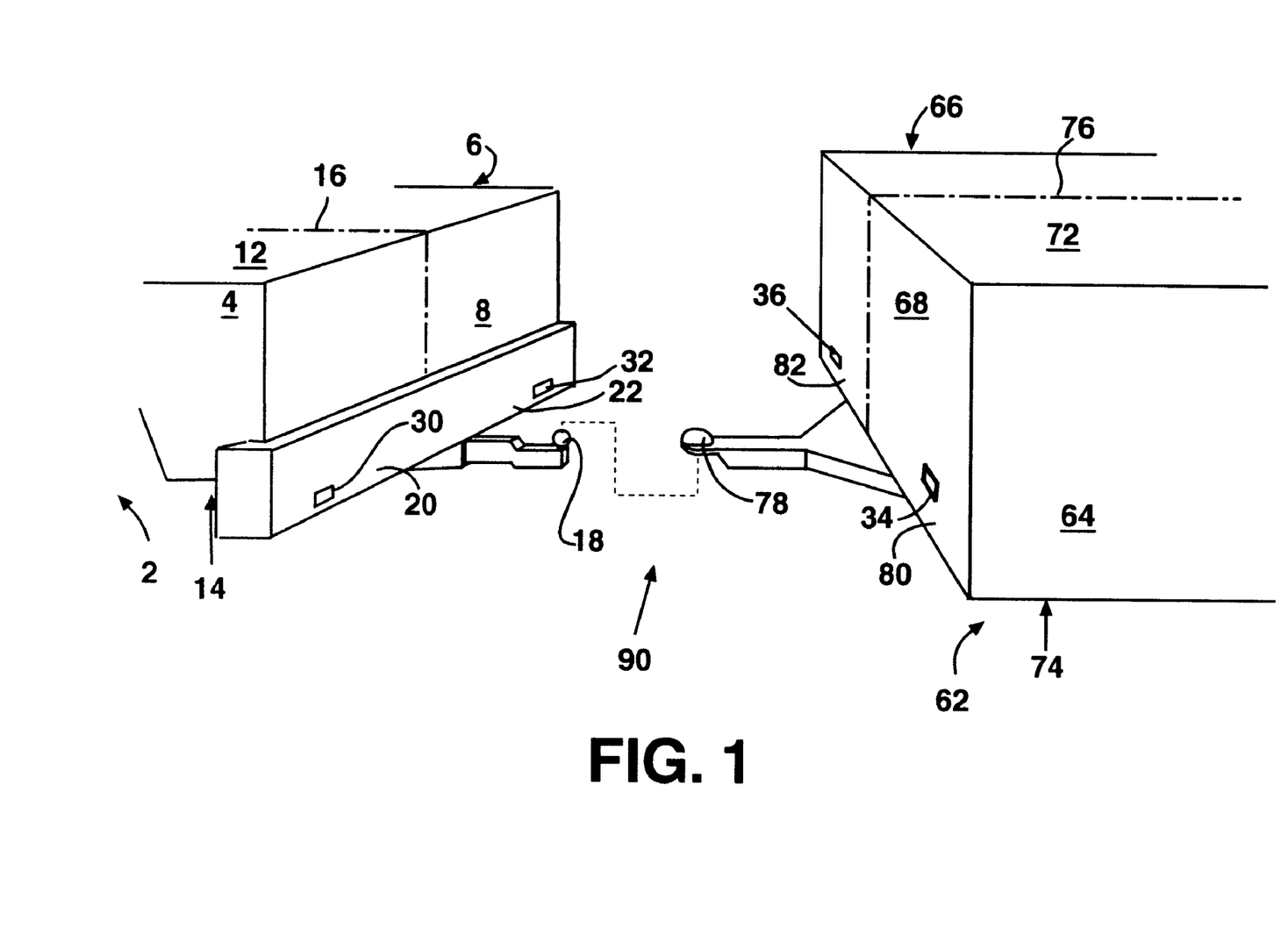
FIG. 1 is a perspective view of a first embodiment of the present invention.

Referring to FIG. 1, the present invention 90 is a method and apparatus used to assist an operator in backing a tow vehicle 2 into hitching alignment with a trailer 62 or other vehicle able to be towed. Such alignment exists when the first hitch component 18 mounted on the tow vehicle 2 is moved into coupling engagement with the corresponding second hitch component 78 mounted on the trailer 62. As with most vehicles, a tow vehicle 2 will have a first side 4 (the "driver's" side) opposite a second side 6 (the "passenger" side), a first end 8 (the rear end) opposite a second end (the front end), and a top side 12 opposite a bottom side 14.

Using this nomenclature, a "centerline" 16 can be defined as extending from the first end 8 to the second end generally centered between the first side 4 and the second side 6. Thus, this centerline 16 further defines a rear end left side 20 and a rear end right side 22. On a typical tow vehicle 2, the first hitch component 18 will generally be mounted adjacent to the rear (first) end 8 and generally at or near the centerline 16. This first hitch component is mounted in a fixed relationship with the rear end 8 of the vehicle 2.

Likewise, the trailer 62 (or other vehicle being towed), has a first side 64 opposite a second side 66, a first end 68 (the front end) opposite a second end (the rear end), and a top side 72 opposite a bottom side 74. Using this nomenclature, a "centerline" 76 can be defined as extending from the first end 68 to the second end generally centered between the first side 64 and the second side 66. Thus, this centerline 76 further defines a front end left side 80 and a front end right side 82. The second hitch component 78 is generally mounted adjacent to the first end 68 of the trailer and generally at or near the trailer's centerline 76. This second hitch component is mounted in a fixed relationship with the front end 68 of the trailer 62.

Figure 4:
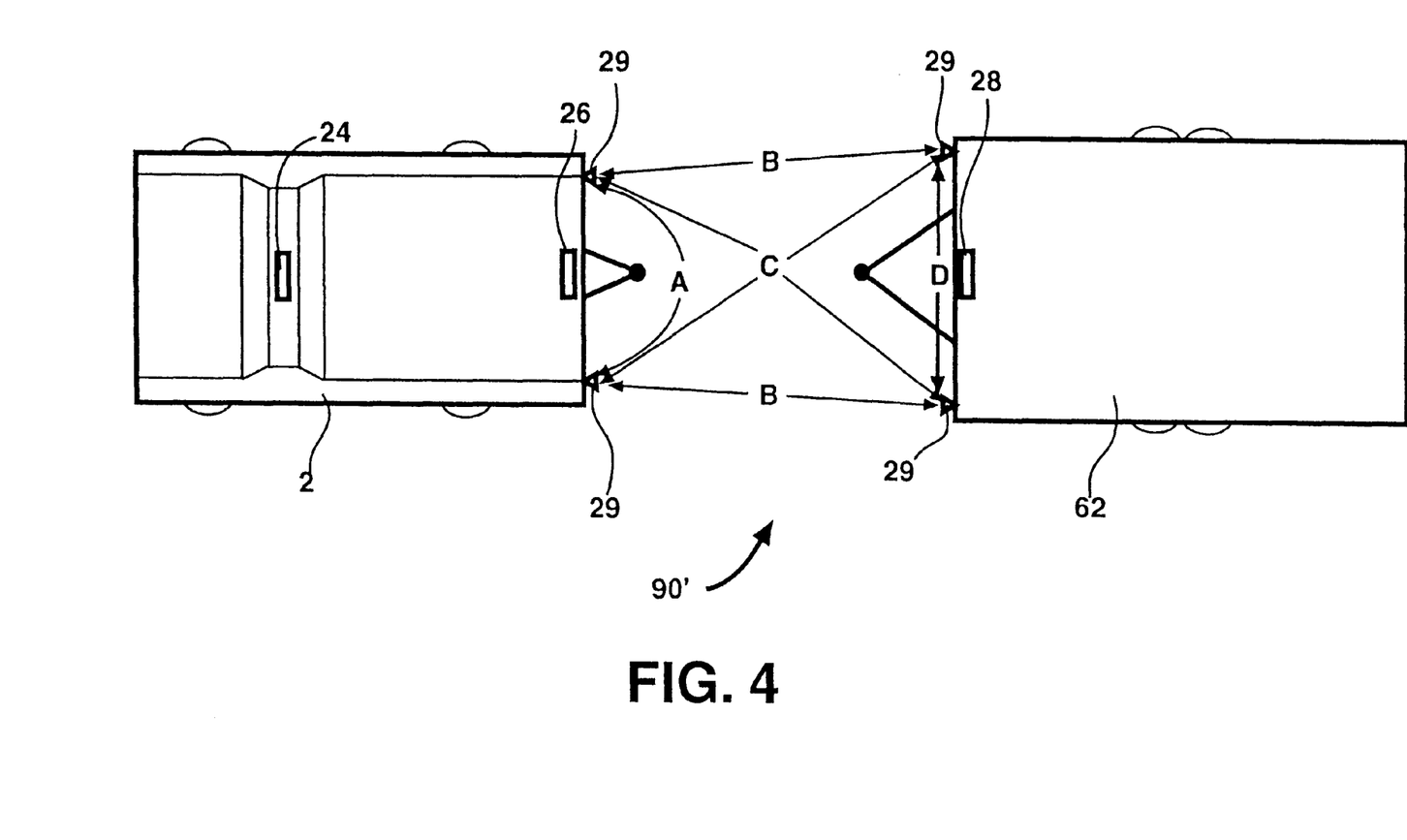
FIG. 4 is a top plan view of a fourth embodiment of the present invention.

Referring to FIG. 4, the present invention 90 utilizes a number of sensors 29 to determine the location of the tow vehicle 2 in relation to the trailer 62. The preferred sensors 29 are ultrasonic transducers able to transmit and receive ultrasonic signals. These sensors 29 relay data received to a control unit 24 of the present invention 90 which analyzes such information and creates a display able to be read by the user of the device 90 which shows in real-time how the vehicle's hitch component 18 is aligning with the trailer's hitch component 78. This relay of data can be accomplished through a number of means, including, but not limited to, radio frequencies and wiring. Alternatively, these sensors may relay data to at least one transmitter 26, 28 which transmits such information to the control unit 24.

Referring back to FIG. 1, in a first embodiment 90, a first sensor/transducer 30 is placed on the first end left side 20 of the vehicle 2 and a second transducer 32 is placed on the first end right side 22 of the vehicle 2, the first and second transducers 30, 32 being mounted generally symmetrical about the center line 16. A third transducer 34 is placed on the second end left side 80 of the trailer 62 and a fourth transducer 36 is placed on the second end right side 82 of the trailer 62, the third and fourth transducers 34, 36 being mounted generally symmetrical about the center line 76. It is preferred that a line drawn between the first and second transducers 30, 32 be perpendicular to the centerline 16 of the vehicle 2 and a line drawn between the third and fourth transducers 34, 36 be perpendicular to the centerline 76 of the trailer 62.

In this first embodiment 90, measurements may be taken between the transducers 30, 32 located on the vehicle 2 and the transducers 34, 36 located on the trailer 62 to determine the relationship of the line defining the rear end 8 of the vehicle 2 to the line defining the front end 68 of the trailer 62. By knowing the relationship of these lines, and knowing the location of the hitch components 18, 78 in relation to these lines, one can create a display useful in assisting an operator in backing the vehicle 2 properly up into hitching alignment with the trailer 62.

One example of such measurements could be measuring the distance between the first transducer 30 and the third transducer 34, between the first transducer 30 and the fourth transducer 36, and between the second transducer 32 and the third transducer 34, and between the second transducer 32 and the fourth transducer 36. Using software algorithms, the angle between the rear end 8 and the front end 68 can be determined, after the system has been initialized and configured. Information regarding the position (distances and angles) of the vehicle first end 8 in relation to the trailer first end 68 can then be displayed to a user guiding the vehicle to move the first hitch component 18 into coupling engagement with the corresponding second hitch component 78.

Figure 2:
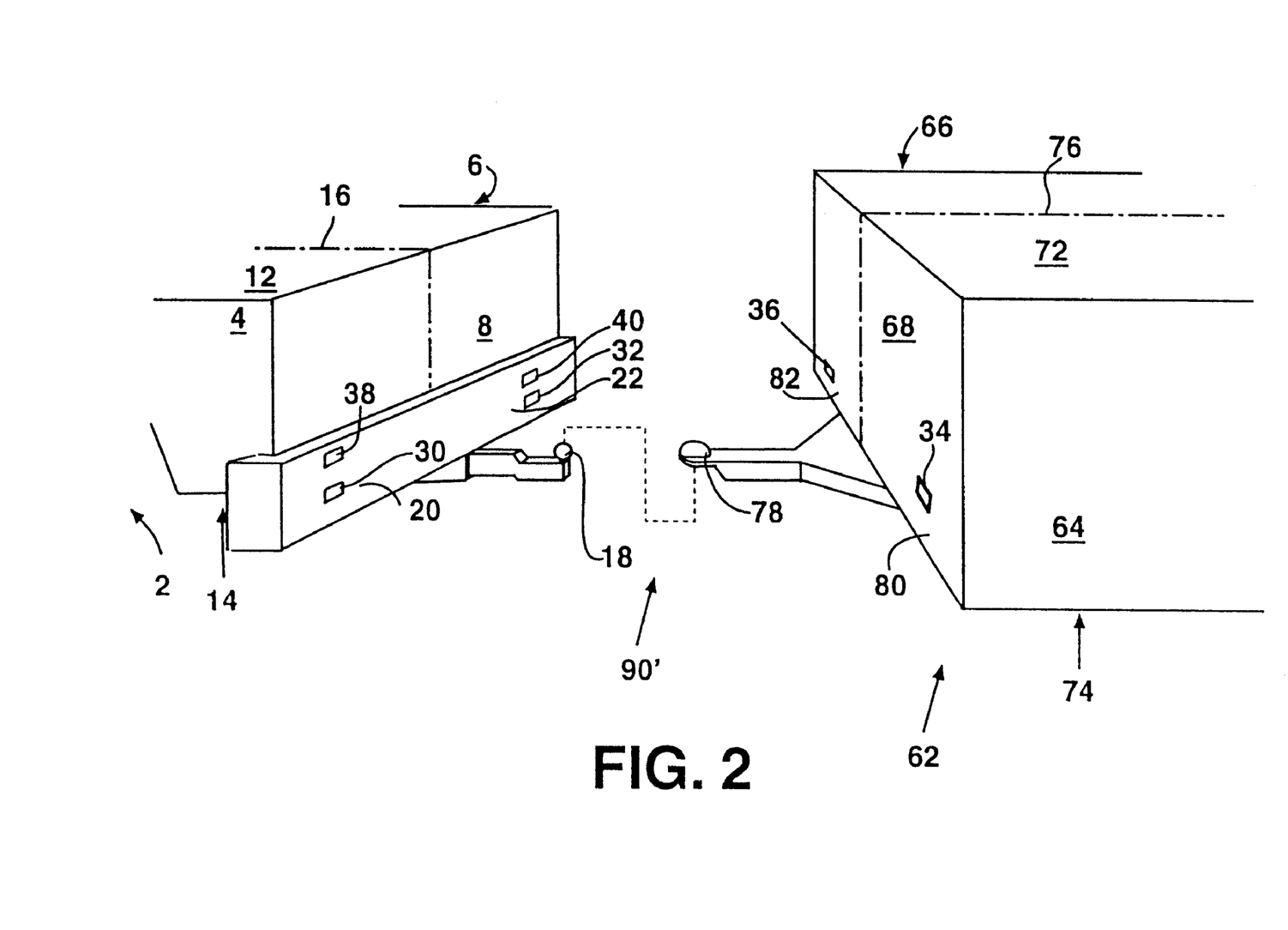
FIG. 2 is a perspective view of a second embodiment of the present invention.

Referring now to FIG. 2, in a second embodiment 90' an additional (in comparison to the first embodiment) pair of transducers are included. The fifth transducer 38 and the sixth transducer 40 are preferably both located on the same vehicle (either the tow vehicle or the trailer). In the embodiment 90' shown, the fifth and sixth transducers are located on the vehicle 2. In the second embodiment of the present invention 90', the fifth transducer 38 is mounted adjacent to and above the first transducer 30 and the sixth transducer 40 is mounted adjacent to and above the second transducer 32. It is preferred that the fifth and sixth transducers be parallel to the first and second transducers and perpendicular to the centerline 16. It is preferred that the first 30 and fifth 38 transducers be spaced a predetermined distance apart. It is also preferred that the second 32 and sixth transducers 40 be spaced a predetermined distance apart.

In this second embodiment 90', measurements can be taken between the transducers located on the vehicle and the transducers located on the trailer to determine the relationship of the plane known as the rear end of the vehicle to the line known as the front end of the trailer (or vice versa). One example of such measurements could be measuring the distance between the first transducer 30 and the third transducer 34, between the first transducer 30 and the fourth transducer 36, between the second transducer 32 and the third transducer 34, between the second transducer 32 and the fourth transducer 36, between the fifth transducer 38 and the third transducer 34, between the fifth transducer 38 and the fourth transducer 36, between the sixth transducer 40 and the third transducer 34, and between the sixth transducer 40 and the fourth transducer 36. Knowing the fixed distances between the various transducers easily allows the determination of the relationship of the plane defined as the rear end 8 of the vehicle 2 in relation to the line extending between the third and fourth transducers. Information regarding the position of the vehicle rear end plane in relation to the trailer front end line can then be displayed to a user guiding the vehicle 2 to move the first hitch component 18 into coupling engagement with the corresponding second hitch component 78.

Figure 3:
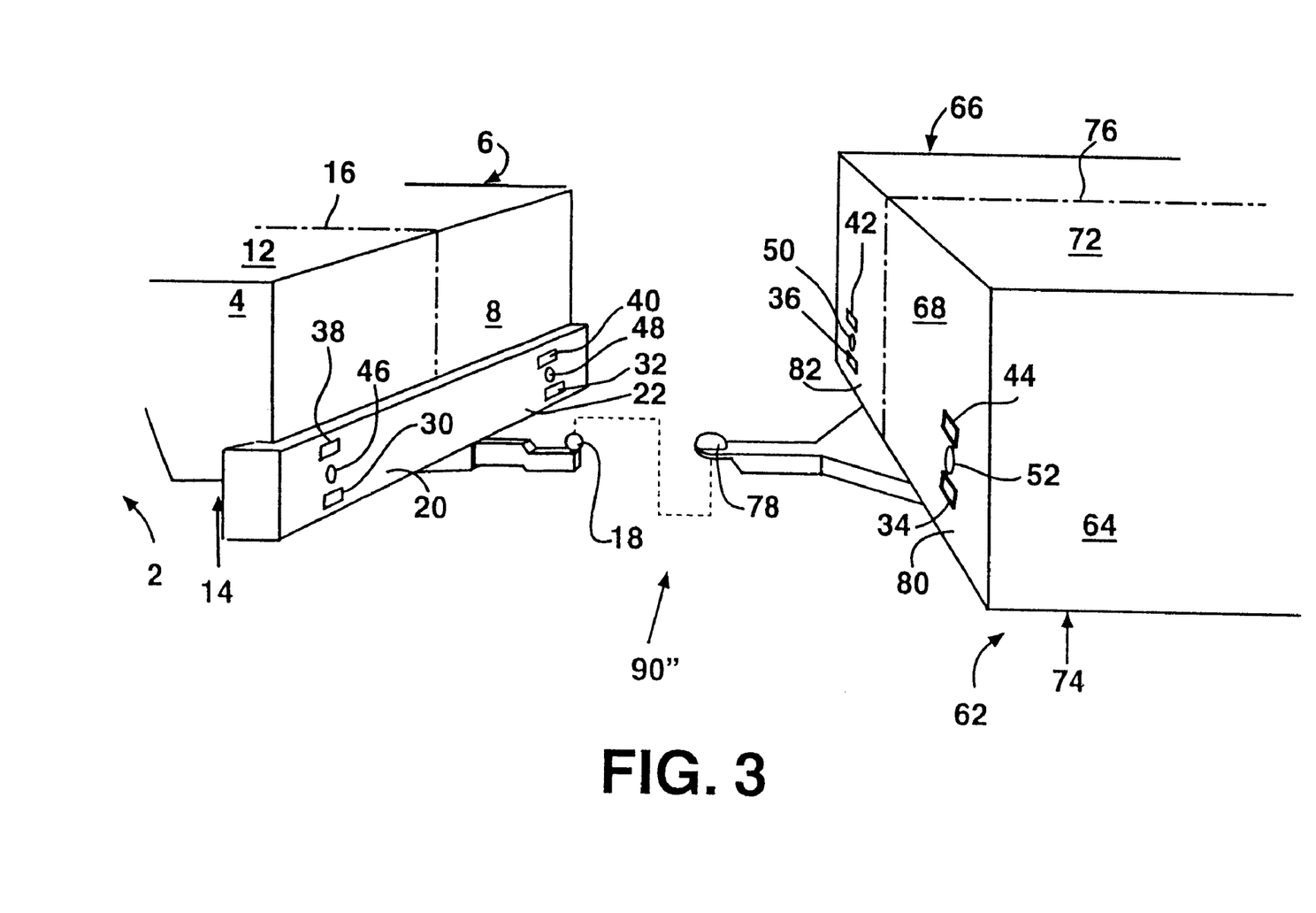
FIG. 3 is a perspective view of a third embodiment of the present invention.

Referring now to FIG. 3, in a third, and preferred, embodiment 90", an additional (in comparison to the second embodiment 90') pair of transducers are included. The seventh transducer 42 and the eighth transducer 44 are preferably both located on the opposite vehicle (either the tow vehicle or the trailer) from the fifth and sixth transducers 38, 40. In the preferred version of the third embodiment 90", the seventh transducer 42 is mounted adjacent to and above the fourth transducer 36 and the eighth transducer 44 is mounted adjacent to and above the third transducer 34. In such a manner, a line drawn between the seventh transducer 42 and the eighth transducer 44 is perpendicular to the centerline 76 of the trailer 62. It is preferred that the fourth and seventh transducers be spaced a predetermined distance apart. It is also preferred that the third and eighth transducers be spaced a predetermined distance apart.

In this third embodiment 90", measurements can be taken between the transducers located on the vehicle and the transducers located on the trailer to determine the relationship of the plane known as the rear end 8 of the vehicle to the plane known as the front end 68 of the trailer (or vice versa). One example of such measurements could be measuring the distance between the first transducer 30 and the third, fourth, seventh, and eighth transducers (respectively 34, 36, 42, 44), between the second transducer 32 and the third, fourth, seventh, and eighth transducers, between the fifth transducer 38 and the third, fourth, seventh, and eighth transducers, between the sixth transducer 40 and the third, fourth, seventh, and eighth transducers, between the seventh transducer 42 and the first, second, fifth, and sixth transducers, between the eighth transducer 44 and the first, second, fifth, and sixth transducers, between the third transducer 34 and the first, second, fifth, and sixth transducers, between the fourth transducer 36 and the first, second, fifth, and sixth transducers. Once the system has configured and determined the distances between the sensors mounted on vehicles 2 and 8, then the relationship of the plane of the vehicle rear end 8 to the plane of the trailer front end 68 can be determined. Information regarding the position of the vehicle first/rear end plane in relation to the trailer first/front end plane can then be displayed to a user guiding said vehicles to move the first hitch component 18 into coupling engagement with the corresponding second hitch component 78.

Also shown in FIG. 3 are the optional environmental sensors. The environmental sensors can be used to compensate for the environmental conditions (air pressure, temperature, humidity, etc.). This measurement will be used to adjust the measurements taken by all other transducers. The preferred environmental sensors 46, 48, 50, 52 are ultrasonic transducers. The preferred placement of the environmental sensors are shown in FIG. 3. In the embodiment shown, a first environmental sensor 46 is shown mounted on the first end left side 20 of the vehicle and a second environmental sensor 48 is shown mounted on the first end right side 22 of the vehicle. The first environmental sensor 46 and the second environmental sensor 48 will need to be placed so as to be able to communicate with one another. Measuring the distance between two sensors 46, 48 it is easy to determine an environmental condition factor that will be used to adjust all other measurements accordingly. Likewise, or optionally, a third environmental sensor 50 and a fourth environmental sensor 52 could be placed upon the trailer 62.

Referring again to FIG. 4 in the preferred embodiment 90', the control unit 24 controls a vehicle transceiver 26 and a trailer transceiver 28 via RF communications. The vehicle transceiver 26 attaches to the vehicle 2 and transmits/receives ultrasonic signals. The vehicle transceiver 26 is able to communicate using RF (radio frequency communications) with the control unit 24 and the trailer transceiver 28. The trailer transceiver 28 attaches to the trailer 62 and transmits/receives ultrasonic signals. The trailer transceiver 28 communicates using RF with the control unit and the vehicle transceiver.

Figure 5:
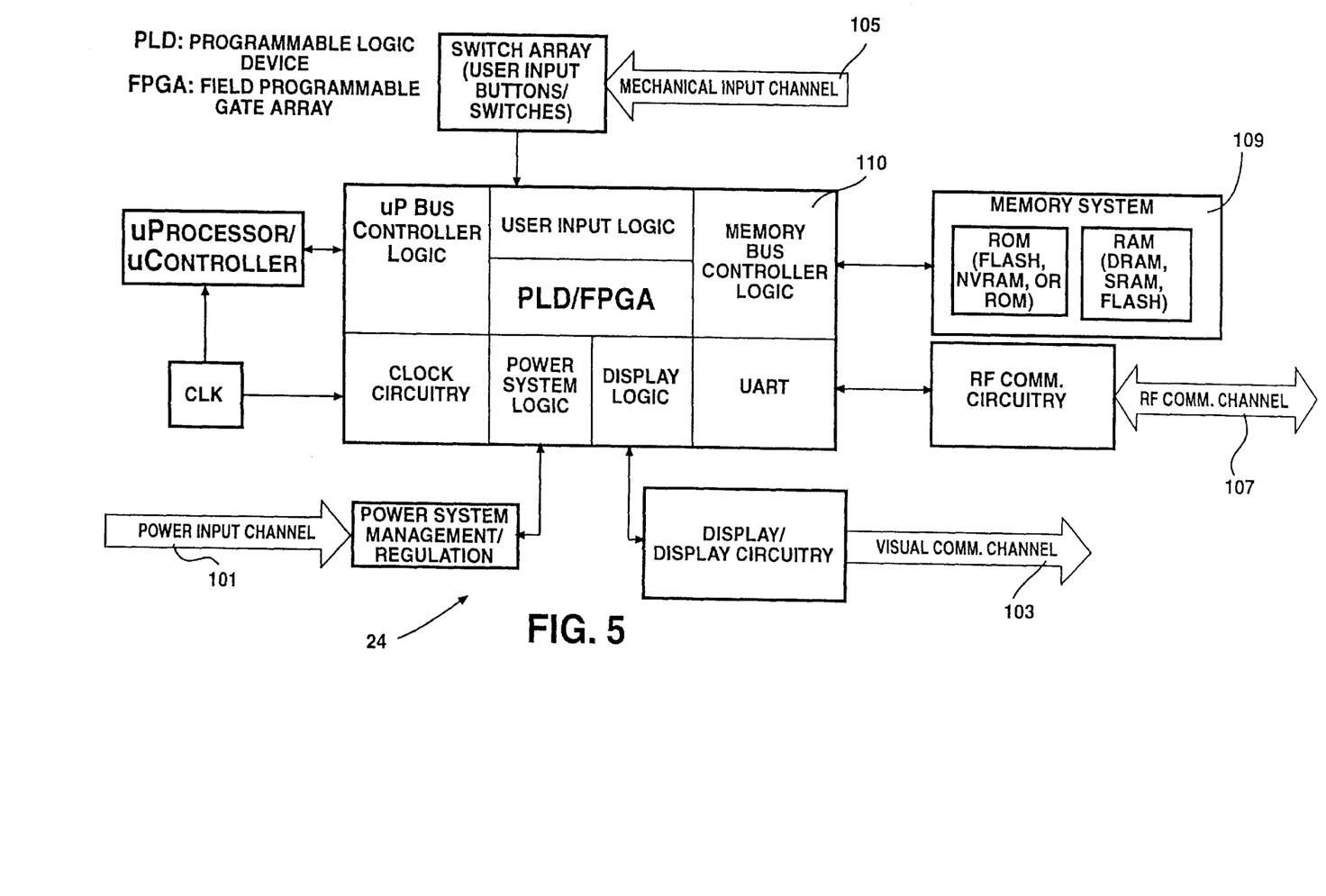
FIG. 5 is a schematic representation of one embodiment of the control unit of the present invention.

FIG. 5 shows one embodiment of the control unit 24 in a functional block diagram form. The control unit has a power source 101, represented by the power input channel, preferably from the 12 volt DC output of the vehicle. Other power sources for this and all powered components of the present invention, are also envisioned, including but not limited to batteries, solar cells, etc. The control unit has a display 103 (the visual communication channel) that shows the relative positions of the vehicle and the trailer with respect to each other. A user is able to input settings into the control unit through an input means 105. The input means may include, but not be limited to, switches/buttons (the mechanical input channel) and/or a touch-screen VFD (Vacuum Florescent Display).

Figure 7:
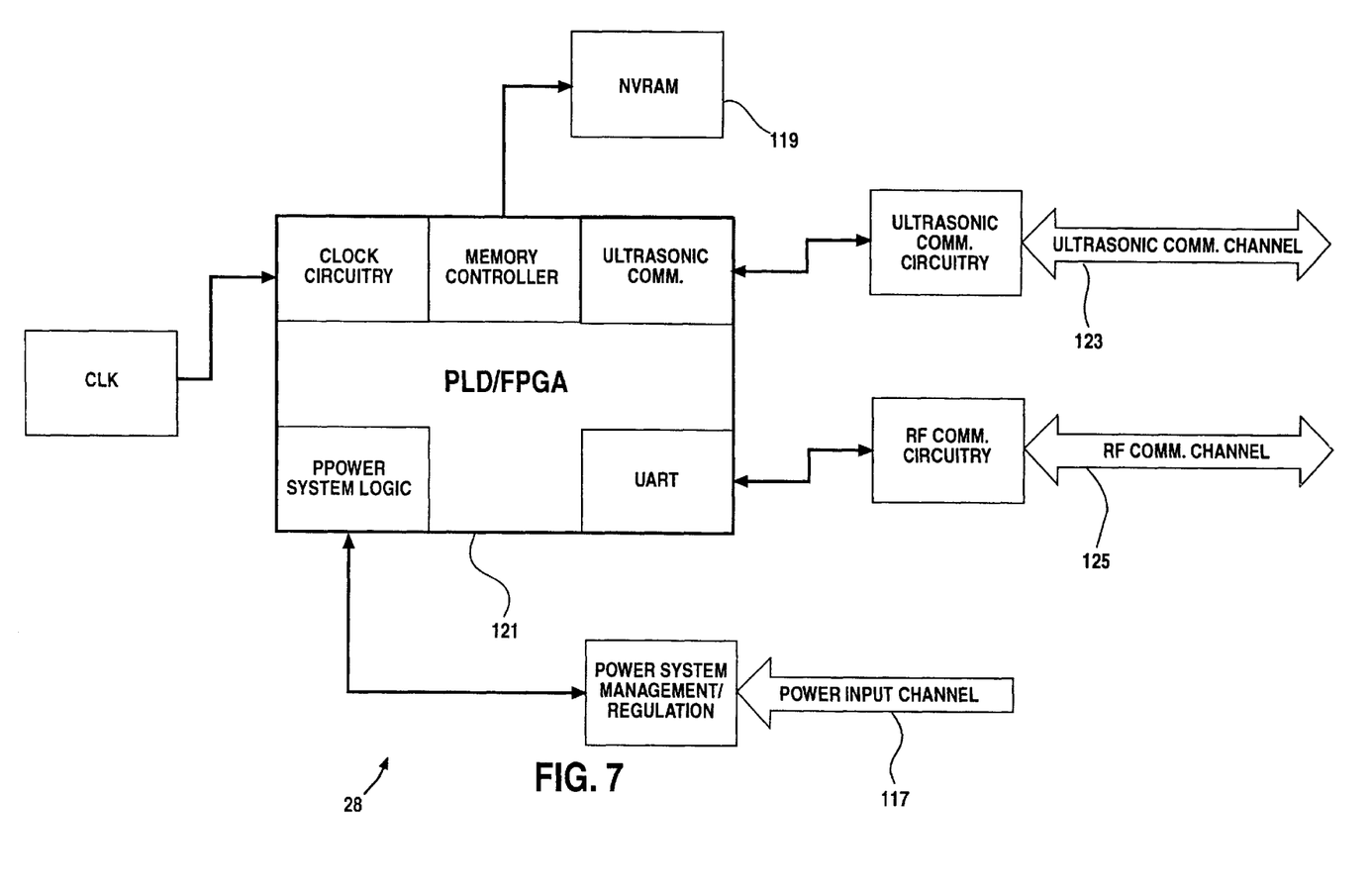
FIG. 7 is a schematic representation of one embodiment of the trailer transceiver of the present invention.

The control unit 24 controls the vehicle and trailer transceivers, preferably using RF (represented by the RF communication channel 107). Once the vehicle is hooked to a trailer that utilizes the present invention, the x-y-z data of the location of the vehicle's hitch component is saved in the control unit memory system 109 (the x-y-z location data of the trailer's hitch component will be saved in the trailer transceiver 28 NVRAM 119 as shown in FIG. 7). The next time the vehicle attempts to hook-up with a trailer that utilizes the invented system, the x-y-z data about that particular trailer can be retrieved from the trailer transceiver's memory by way of the RF communication channel 107, and the relative locations of the tow-vehicle's hitch to the trailer's hitch can be easily calculated. Processing of information is done by a μPLD/FPGA (Programmable Logic Device/Field Programmable Gate Array) 110.

Figure 6:
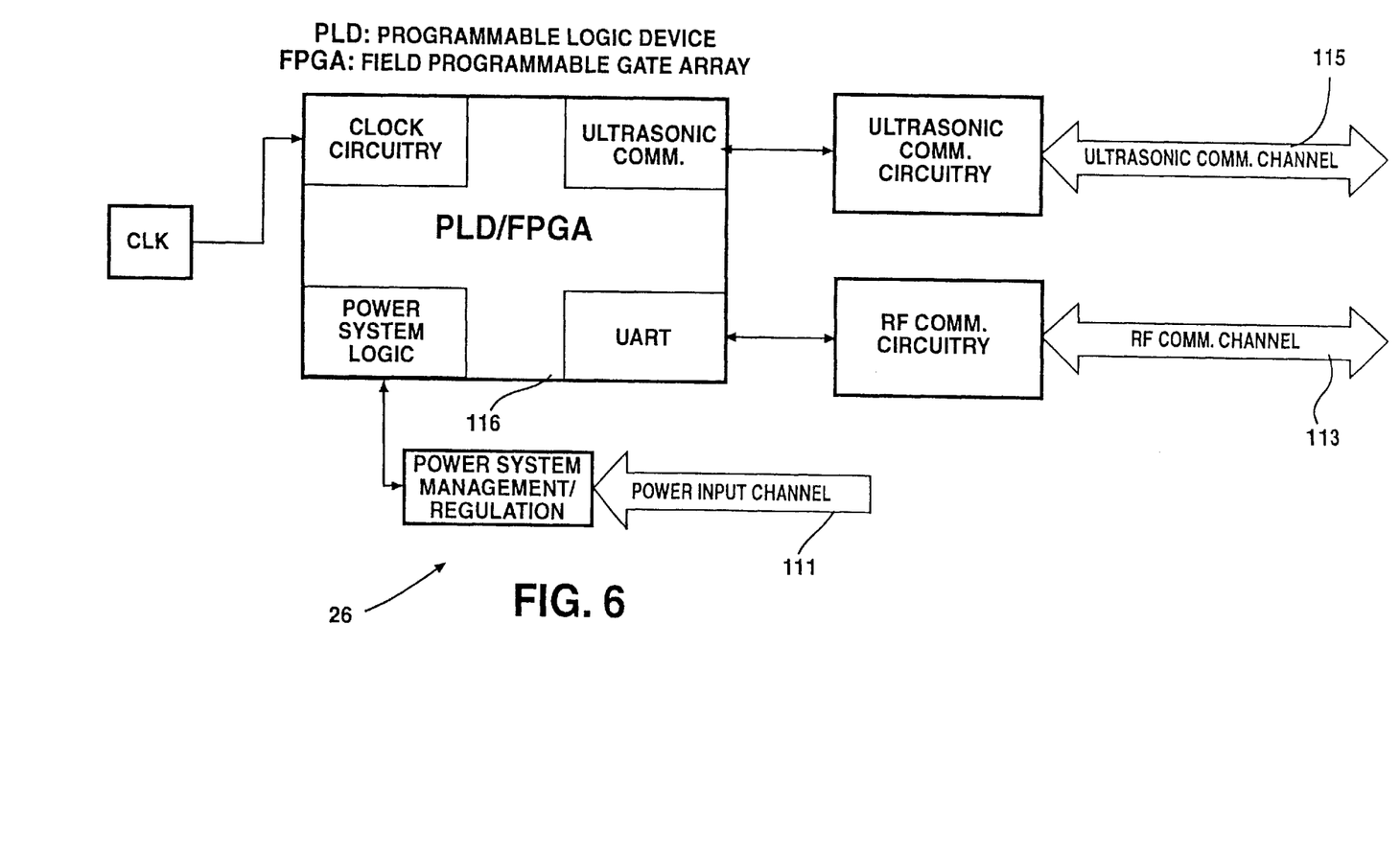
FIG. 6 is a schematic representation of one embodiment of the vehicle transceiver of the present invention.

Referring now to FIG. 6, one embodiment of the vehicle transceiver 26 is shown in functional block diagram format. Unlike the control unit 24 which preferably interfaces to the μProcessor/μController along with a power system through the 12 volt DC power output (the cigarette lighter of almost any automobile) the vehicle transceiver 26 preferably interfaces with the power system through the electrical system of the vehicle (represented by the power input channel 111). One manner of connecting the vehicle transceiver to the vehicle's electrical system is through use of a splice from the 12-volt electrical system. Other power sources would also be possible, including, but not limited to batteries, solar power, etc.

The vehicle transceiver 26 communicates with both the control unit 24 and the trailer transceiver 28 using RF (the RF communication channel 113). The vehicle transceiver 26 uses the ultrasonic communication channel 15 attached to the transducers to measure the relative distances from the vehicle 2 to the trailer 62. Processing of information is done by a PLD/FPGA (Programmable Logic Device/Field Programmable Gate Array) 116.

It should be noted that although no microprocessor is shown in the block diagram, one could have been used in addition to or in place of the basic PLD/FPGA shown in FIG. 6.

Referring now to FIG. 7, the trailer transceiver 28 is shown in functional block diagram format. The trailer transceiver's power input channel 117 preferably utilizes a rechargeable battery system in addition to the normal 12 volt DC system. This is because during a trailer hook-up, most trailers do not have a power source available. Thus, it uses the battery system during the trailer hook-up synchronization process; after hook-up it utilizes the 12-volt power system both as a power source and as a means to recharge the battery system. Optionally, solar cells could be used to recharge the battery system or operate the trailer transceiver itself Ideally, the trailer transceiver should be designed so that very little power is consumed when sitting idle. For example, a power-down/sleep mode should be utilized when the trailer transceiver is not in operation but during a trailer hook-up the device should wake up and become fully functional.

In one embodiment, the trailer transceiver 28 uses the NVRAM memory 119 to store x-y-z location data specific to the trailer. For example, the x-y-z location data of the trailer's hitch is stored in this memory. This allows an operator of a vehicle that utilizes the invented system to hook-up to a trailer that has x-y-z location data stored in the NVRAM memory. Like the vehicle transceiver, the trailer transceiver could also utilize a microprocessor in addition to or to replace the PLD/FPGA 121. The ultrasonic communication channel 123 and the RF communication channel 125 are similar to ones defined for the vehicle transceiver 26.

Figure 8:
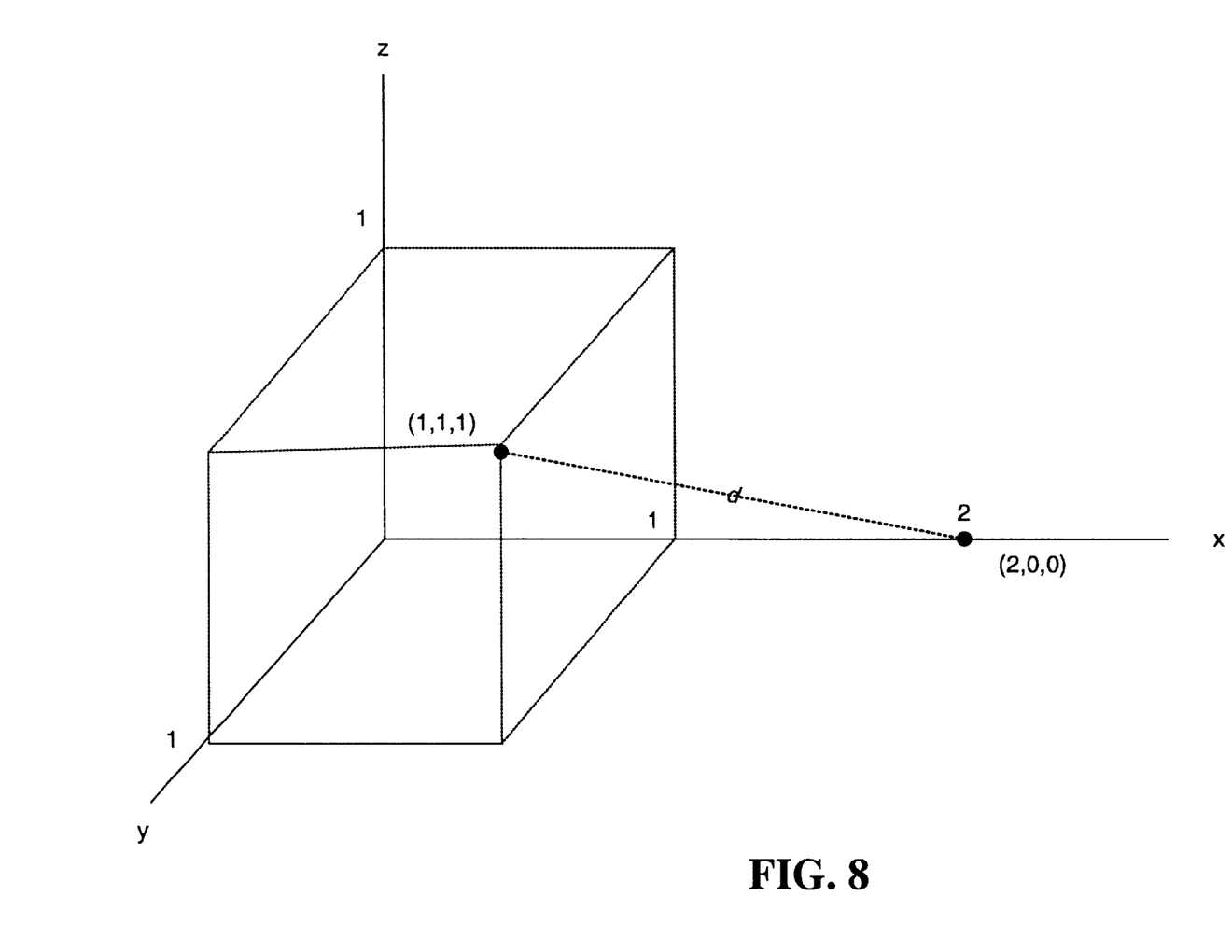
FIG. 8 depicts the concept of three-dimensional measurements.

FIG. 8 shows a three-dimensional drawing with two different points in space. One is located at point (1,1,1) and the other is located at point (2,0,0). Using ultrasonic transducers, it is possible to measure the distance, d, between these two points. One possible method of doing this would be to send a high-speed start signal before sending any ultrasonic signals. The start signal could easily be realized with a RF communication signal that travels near the speed of light. The RF signal travels orders of magnitude faster than an ultrasonic signal that travels around the speed of sound. Thus, a transducer at location (2,0,0) could receive a start signal (RF signal) that it could key off to begin a timer that stops when the slower ultrasonic signal is received some time later, t, from the transmitter at location (1,1,1). Utilizing the known speed of sound, preferably adjusted for the environmental conditions, one could easily determine the distance between the two points knowing the time that it took for the ultrasonic signal to travel over the distance in question. A second possible method would be to instantaneously transmit two signals that travel through air at different velocities, such as the manner shown in the patent to Nelson (U.S. Pat. No. 5,191,328).

Figure 9:
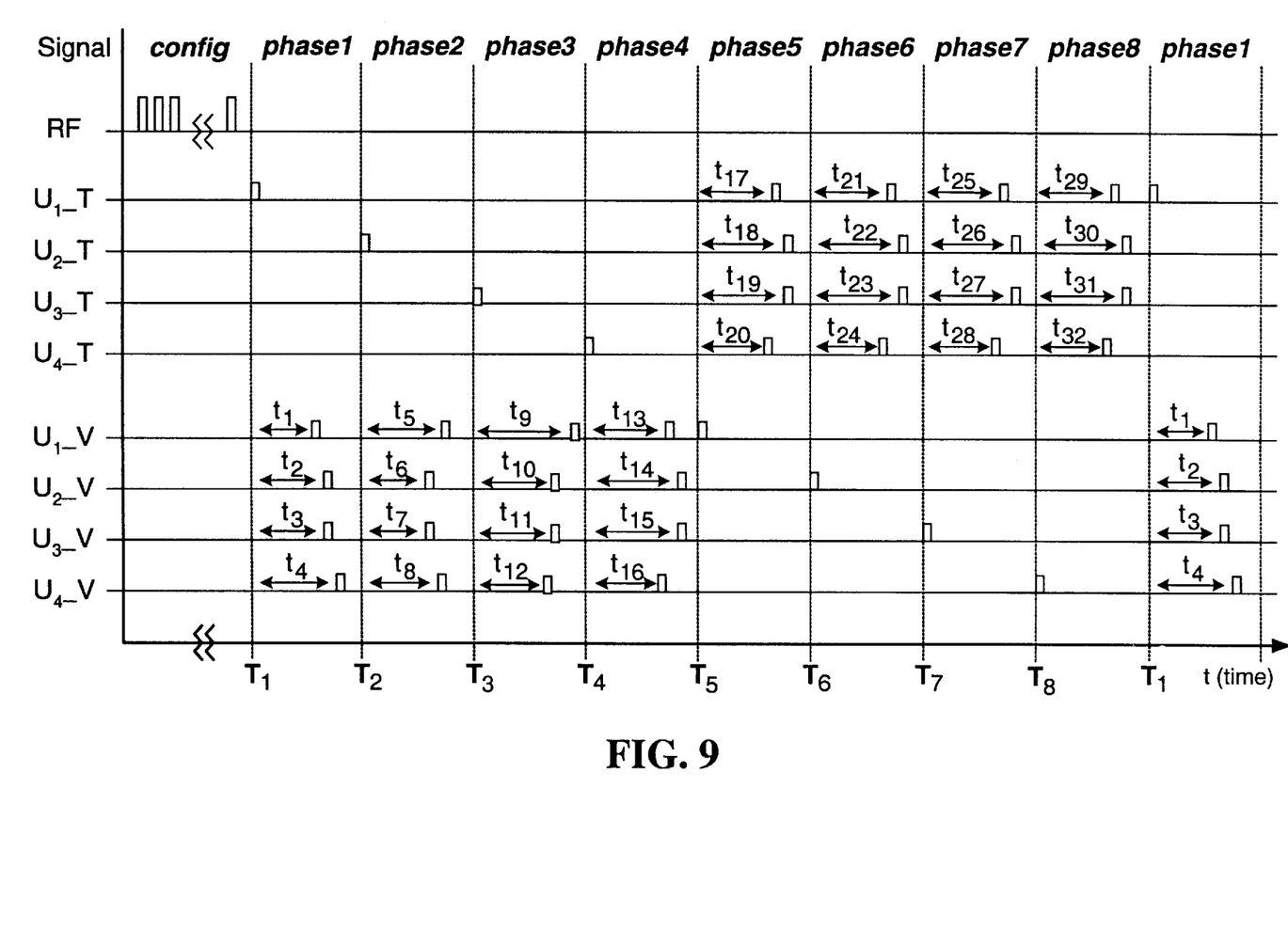
FIG. 9 depicts one possible manner of point-to-point distance measuring.

Although the method mentioned above is one solution for doing point-to-point measuring, FIG. 9 shows another process the present invention can utilize to achieve point-to-point distance measuring. This process assumes there are four ultrasonic transducers on both the vehicle and the trailer; however, the same process is valid for both the first and second embodiments of 90. During the configuration (config) phase, the vehicle transceiver and the trailer transceiver exchange configuration data via the RF communication channel. Configuration data would be data like the x-y-z data location of the hitch components or the number of transducers or the synchronization period that will be used. A config phase can occur whenever the invented system wants to adjust the system parameters. The most likely reason for doing this is to adjust the synchronization period. Once a config phase is finished then the synchronized point-to-point distance measuring occurs. Notice that only one ultrasonic transducer on either the trailer ($U_x$_T) or the tow-vehicle ($U_x$_V) sends a pulse during any one period of time and that all the transducers on the other vehicle receive the pulse some time later. The different times that are measured ($t_x$) are then used to determine the point-to-point distances from the transmitting transducer to each of the receiving transducers.

As was mentioned above, the synchronization period can be adjusted at any time during a config phase. This allows the invented system to adjust the measuring capabilities of the system as the distance between the vehicle and the trailer changes. For example, when the invented apparatus is first being used, the distance between the vehicle and the trailer requires the period, T, to be longer but as the vehicle moves closer and closer to the trailer, the period decreases. This allows the invented system to adjust the measuring accuracy according to the relative locations of the vehicle and the trailer.

Figure 10:
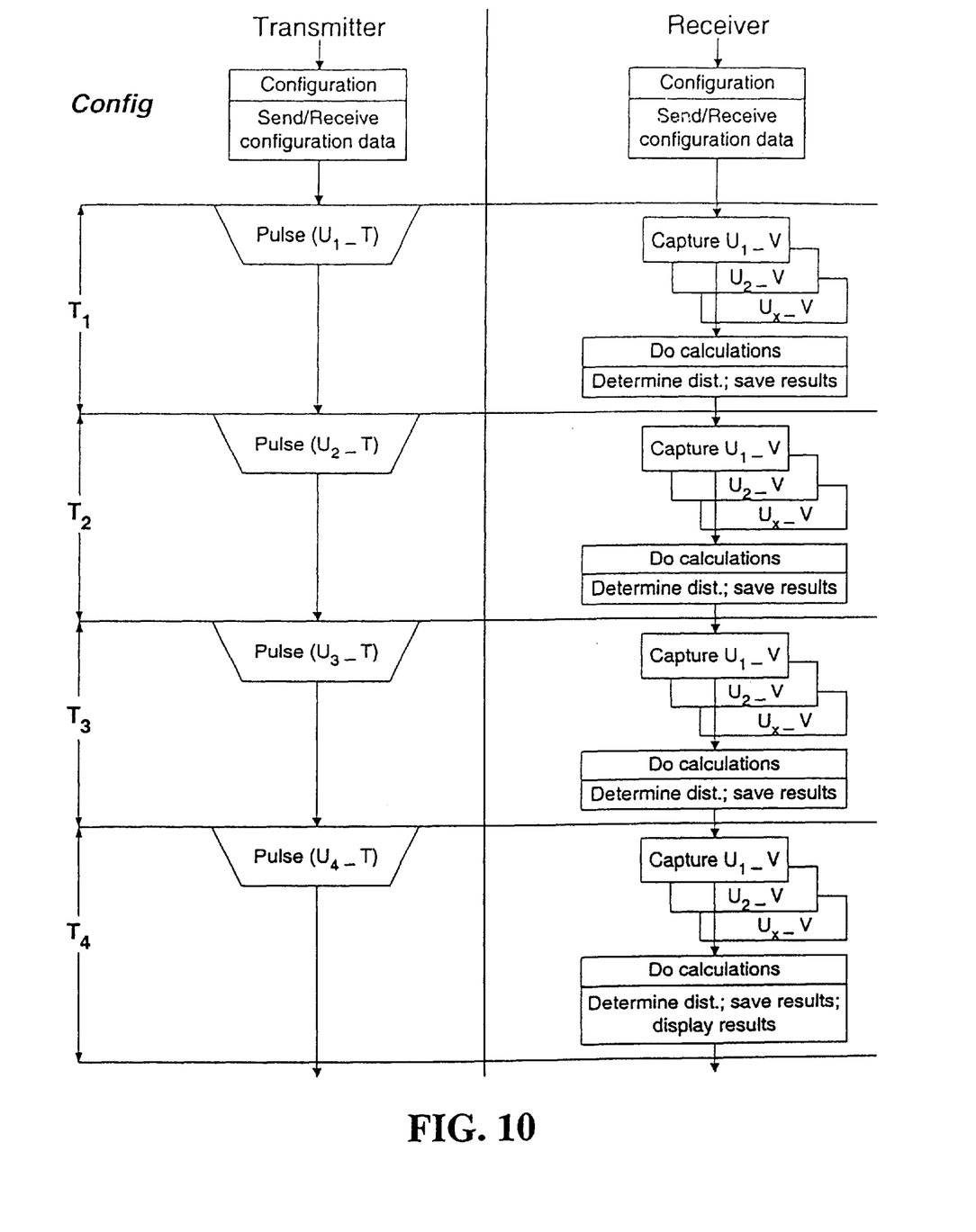
FIG. 10 depicts state transitions that could occur with the manner of FIG. 9.

FIG. 10 shows the state transitions that occur for both the vehicle transceiver and the trailer transceiver during the states config through $T_4$. Notice that the vehicle transceiver's computational capabilities must allow all processing to be finished before the next pulse is sent by the trailer transceiver. Otherwise data could be calculated incorrectly and serious errors could result.

Figure 11:
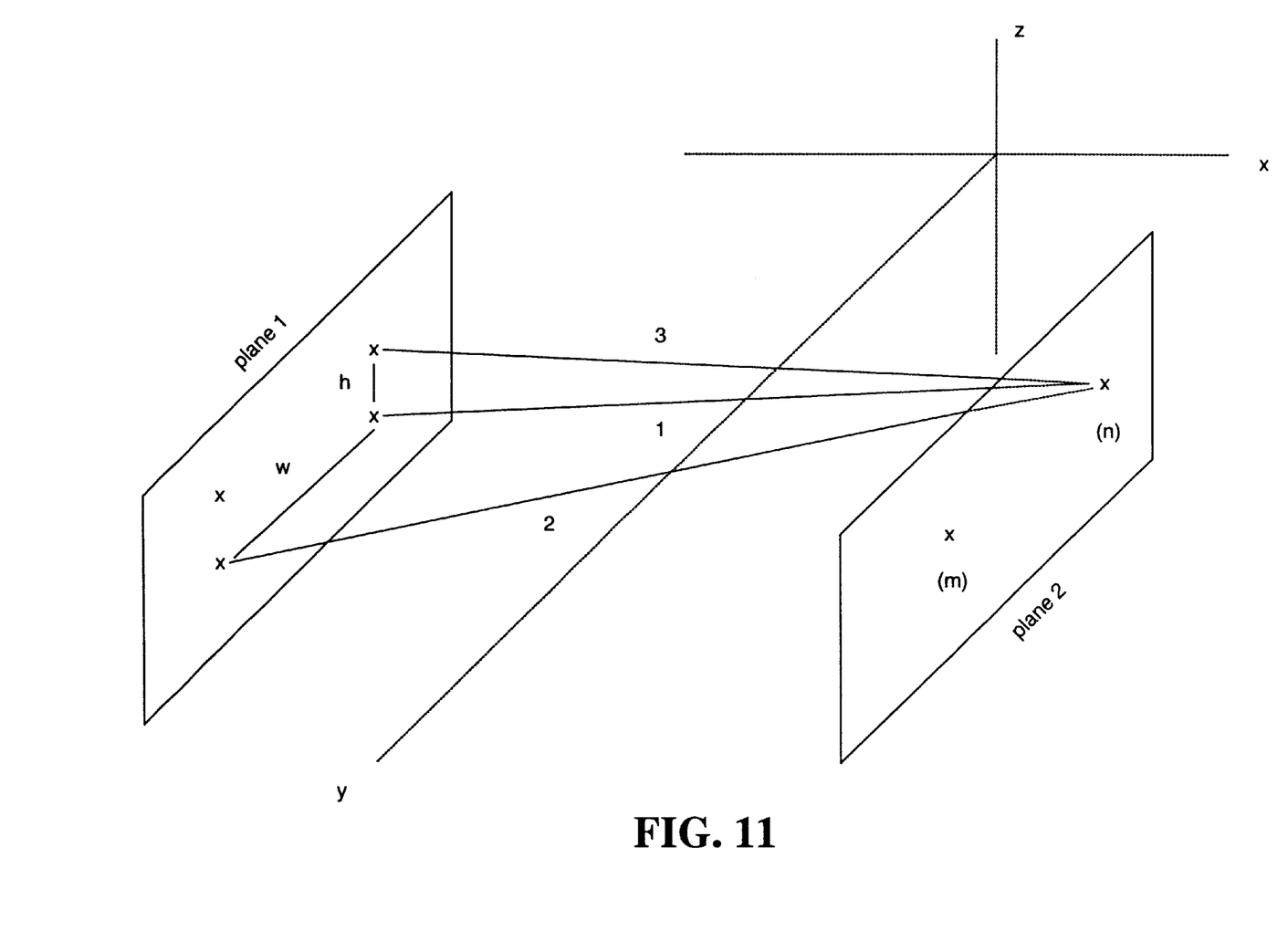
FIG. 11 depicts the concept of triangulation used with some embodiments of the present invention.

Another term that should be defined is called "triangulation". This is the process of determining the position of two surface planes relative to each other. FIG. 11 shows an example where triangulation is used to determine the relative plane location of surface plane 1 to surface plane 2. Assume the 'x' and 'x' are ultrasonic transducers mounted onto some arbitrary surface, plane 1. Triangle (w,1,2) is used to determine the x-y location of point n on surface plane 2 relative to surface plane 1. Triangle (h,3,1) is used to determine the x-z location of point n on surface plane 2 relative to surface plane 1. Using this same procedure, the relative locations of point m on surface plane 2 are determined with respect to plane 1. Thus, the result is that the relative location of surface plane 1 is determined with respect to surface plane 2.

Figure 12A:
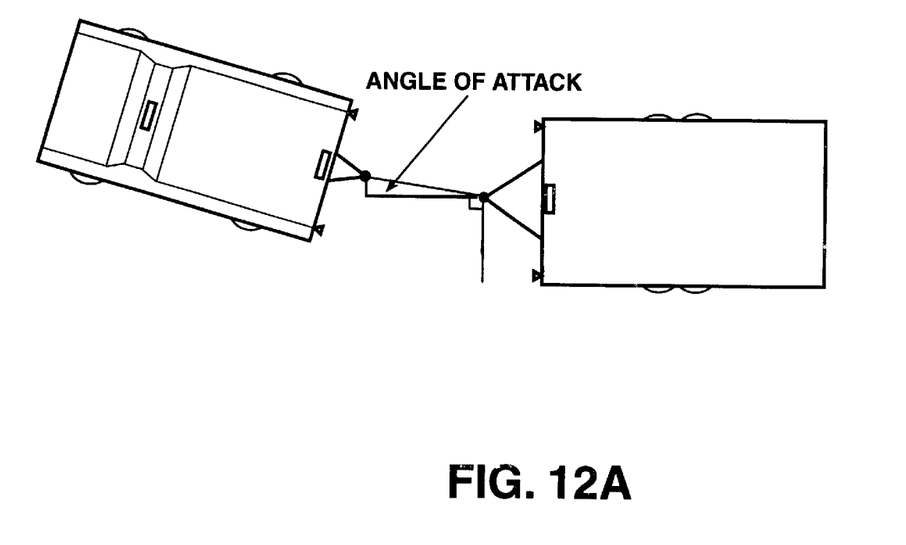
FIG. 12A depicts the concept of angle of attack.
Figure 12B:
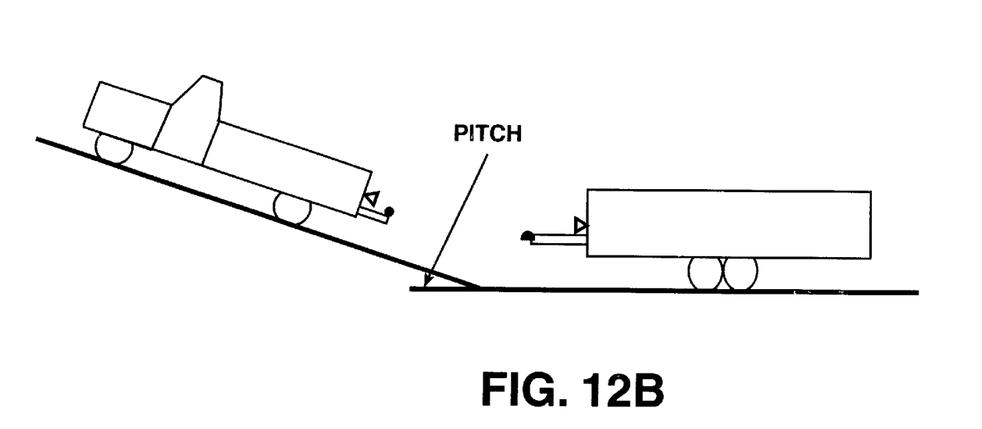
FIG. 12B depicts the concept of pitch.

Two other key terms that need to be defined are the "angle of attack" and the "pitch" (see FIGS. 12A and 12B). The angle of attack is found by determining the approach path of the vehicle relative to the plane that is parallel to the front surface of the trailer. Most attempts to hook-up a trailer will occur by backing the vehicle straight back into the trailer (at an angle of 90° from a plane drawn parallel to the surface of the front of the trailer). If an attempt is made that is not perpendicular to the front plane of the trailer then an angle of attack has been introduced into the measurements of the invented system. The pitch is found by determining the approach path of the vehicle relative to a plane that is parallel to the bottom of the trailer. Most attempts to hook-up a trailer will occur by backing the vehicle on a level surface and will not have any pitch at all. The location and configuration of the transducers are key to determining either the angle of attack or the pitch between the vehicle and the trailer. These terms will be referenced throughout the rest of this document.

While there is shown and described the present preferred embodiment of the invention, it is to be distinctly understood that this invention is not limited thereto but may be variously embodied to practice within the scope of the following claims.

What is claimed is:

1. The method of moving a first hitch component mounted on a first vehicle into coupling engagement with a corresponding second hitch component mounted on a second vehicle, wherein said first vehicle having a first vehicle first side, a first vehicle second side, a first vehicle first end, a first vehicle second end, a first vehicle top side and a first vehicle bottom side, wherein a first vehicle centerline is defined extending from said first vehicle first end to said first vehicle second end generally centered between said first vehicle first side and said first vehicle second side, said first vehicle centerline further defining a first vehicle first end left side and a first vehicle first end right side, said first hitch component generally mounted adjacent to said first vehicle first end and generally on said first vehicle centerline; wherein said second vehicle having a second vehicle first side, a second vehicle second side, a second vehicle first end, a second vehicle second end, a second vehicle top side and a second vehicle bottom side, wherein a second vehicle centerline is defined extending from said second vehicle first end to said second vehicle second end generally centered between said second vehicle first side and said second vehicle second side, said second vehicle centerline further defining a second vehicle first end left side and a second vehicle first end right side, said second hitch component generally mounted adjacent to said second vehicle first end and generally on said second vehicle centerline; said method comprising the steps of:

a) mounting on the first vehicle first end left side a first transducer;

b) mounting on the first vehicle first end right side a second transducer;

c) mounting on the second vehicle first end left side a third transducer;

d) mounting on the second vehicle first end right side a fourth transducer;

e) determining the position of the first vehicle first end in relation to the second vehicle first end by measuring the distance between the first transducer and the third transducer, between the first transducer and the fourth transducer, between the second transducer and the third transducer, and between the second transducer and the fourth transducer; and f) displaying the position of the first vehicle first end in relation to the second vehicle first end to a user guiding said vehicles to move the first hitch component into coupling engagement with the corresponding second hitch component.

2. The method of claim 1 further comprising the step of mounting said first and second transducers symmetrically about said first vehicle centerline.

3. The method of claim 1 further comprising the step of mounting said third and fourth transducers symmetrically about said second vehicle centerline.

4. The method of moving a first hitch component mounted on a first vehicle into coupling engagement with a corresponding second hitch component mounted on a second vehicle, wherein said first vehicle having a first vehicle first side, a first vehicle second side, a first vehicle first end, a first vehicle second end, a first vehicle top side and a first vehicle bottom side, wherein a first vehicle centerline is defined extending from said first vehicle first end to said first vehicle second end generally centered between said first vehicle first side and said first vehicle second side, said first vehicle centerline further defining a first vehicle first end left side and a first vehicle first end right side, said first hitch component generally mounted adjacent to said first vehicle first end and generally on said first vehicle centerline; wherein said second vehicle having a second vehicle first side, a second vehicle second side, a second vehicle first end, a second vehicle second end, a second vehicle top side and a second vehicle bottom side, wherein a second vehicle centerline is defined extending from said second vehicle first end to said second vehicle second end generally centered between said second vehicle first side and said second vehicle second side, said second vehicle centerline further defining a second vehicle first end left side and a second vehicle first end right side, said second hitch component generally mounted adjacent to said second vehicle first end and generally on said second vehicle centerline; said method comprising the steps of:

a) mounting on the first vehicle first end left side a first transducer and a second transducer, said first and second transducers being aligned parallel to a plane containing said centerline and said plane being generally perpendicular to said first vehicle's top and bottom sides, said first transducer nearer said top side than said second transducer;

b) mounting on the first vehicle first end right side a third transducer and a fourth transducer, said third and fourth transducers being aligned parallel to a plane containing said centerline and said plane being generally perpendicular to said first vehicle's top and bottom sides, said third transducer nearer said top side than said fourth transducer;

c) said first and third transducers mounted generally symmetrical about said first vehicle centerline;

d) said second and fourth transducers mounted generally symmetrical about said second vehicle centerline;

e) mounting on the second vehicle first end left side a fifth transducer;

f) mounting on the second vehicle first end right side a sixth transducer;

g) said fifth and sixth transducers mounted generally symmetrical about said second vehicle centerline;

h) determining the position of the first vehicle first end in relation to the second vehicle first end by measuring the distances between the first transducer and the fifth transducer, between the second transducer and the fifth transducer, between the first transducer and the sixth transducer, between the second transducer and the sixth transducer, between the third transducer and the fifth transducer, between the fourth transducer and the fifth transducer, between the third transducer and the sixth transducer, and between the fourth transducer and the sixth transducer; and f) displaying the position of the first vehicle first end in relation to the second vehicle first end to a user guiding said vehicles to move the first hitch component into coupling engagement with the corresponding second hitch component.

5. The method of moving a first hitch component mounted on a first vehicle into coupling engagement with a corresponding second hitch component mounted on a second vehicle, wherein said first vehicle having a first vehicle first side, a first vehicle second side, a first vehicle first end, a first vehicle second end, a first vehicle top side and a first vehicle bottom side, wherein a first vehicle centerline is defined extending from said first vehicle first end to said first vehicle second end generally centered between said first vehicle first side and said first vehicle second side, said first vehicle centerline further defining a first vehicle first end left side and a first vehicle first end right side, said first hitch component generally mounted adjacent to said first vehicle first end and generally on said first vehicle centerline; wherein said second vehicle having a second vehicle first side, a second vehicle second side, a second vehicle first end, a second vehicle second end, a second vehicle top side and a second vehicle bottom side, wherein a second vehicle centerline is defined extending from said second vehicle first end to said second vehicle second end generally centered between said second vehicle first side and said second vehicle second side, said second vehicle centerline further defining a second vehicle first end left side and a second vehicle first end right side, said second hitch component generally mounted adjacent to said second vehicle first end and generally on said second vehicle centerline; said method comprising the steps of:

a) mounting on the first vehicle first end left side a first transducer and a second transducer, said first and second transducers being aligned parallel to a plane containing said centerline and said plane being generally perpendicular to said first vehicle's top and bottom sides, said first transducer nearer said top side than said second transducer;

b) mounting on the first vehicle first end right side a third transducer and a fourth transducer, said third and fourth transducers being aligned parallel to a plane containing said centerline and said plane being generally perpendicular to said first vehicle's top and bottom sides, said third transducer nearer said top side than said fourth transducer;

c) said first and third transducers mounted symmetrical about said first vehicle centerline;

d) said second and fourth transducers mounted symmetrical about said first vehicle centerline;

e) mounting on the second vehicle first end left side a fifth transducer and a sixth transducer, said fifth and sixth transducers being aligned parallel to a plane containing said centerline and said plane being generally perpendicular to said second vehicle's top and bottom sides, said fifth transducer nearer said top side than said sixth transducer;

f) mounting on the second vehicle first end right side a seventh transducer and an eight transducer, said seventh and eighth transducers being aligned parallel to a plane containing said centerline and said plane being generally perpendicular to said second vehicle's top and bottom sides, said seventh transducer nearer said top side than said eighth transducer;

g) said fifth and seventh transducers are mounted symmetrical about said second vehicle centerline;

h) said sixth and eighth transducers are mounted symmetrical about said second vehicle centerline;

i) determining the x-y-z plane the first, second, third and fourth transducers are in and thereby determining the position of said first hitch component;

j) determining the x-y-z plane the fifth, sixth, seventh, and eighth transducers are in and thereby determining the position of said second hitch component; and k) displaying the position of the first hitch component in relation to the second hitch component to aid a user in guiding said vehicles so as to move said first hitch component into coupling engagement with said second hitch component.

6. The method of claim 5, wherein the step of determining the x-y-z plane of the first, second, third and fourth transducers comprises:

a) transmitting at least one signal from each of said first, second, third and fourth transducers;

b) receiving said signals by said fifth, sixth, seventh, and eighth transducers;

c) converting said signals into signal information;

d) relaying said signal information to a processing unit; and, e) determining the location of the first, second, third and fourth transducers through analysis of said signal information.

7. The method of claim 5, wherein the first, second, third and fourth transducers each transmit a pattern of signals at a predetermined interval.

8. The method of claim 5 further comprising the step of determining an environmental condition factor to compensate for the effect of the present environment's temperature and air pressure on the determination of the x-y-z plane of said first vehicle first end using said first, second, third and fourth transducers and the x-y-z plane of the second vehicle first end using said fifth, sixth, seventh, and eighth transducers.

9. The method of claim 8, wherein the step of determining an environmental condition factor further comprises the steps of:

a) mounting on one of said vehicles a ninth transducer and a tenth transducer; wherein said ninth transducer and said tenth transducer are generally symmetrical about the centerline for said vehicle;

b) wherein said ninth transducer transmits a factor signal; wherein said tenth transducer receives said factor signal; relaying data regarding when said signal was sent by the ninth transducer and when said signal was received by said tenth transducer unit to a processing unit; and, c) determining the environmental condition factor through analysis of said signal information between said ninth and tenth transducers.

10. The method of claim 5, wherein the step of determining the x-y-z plane of the fifth, sixth, seventh and eighth transducers comprises:

a) transmitting at least one signal from each of said fifth, sixth, seventh and eighth transducers;

b) receiving said signals by said first, second, third and fourth transducers;

c) converting said signals into signal information;

d) relaying said signal information to a processing unit;

e) determining the location of the fifth, sixth, seventh and eighth transducers through analysis of said signal information.

11. The method of claim 10, wherein the location of the second hitch component in relation to the x-y-z plane of the fifth, sixth, seventh and eighth transducers is predetermined.

12. The method of claim 5, wherein the fifth, sixth, seventh and eighth transducers each transmit a pattern of signals at a predetermined interval.

* * * * *